US008812846B2

(12) United States Patent
Tam

(10) Patent No.: US 8,812,846 B2
(45) Date of Patent: *Aug. 19, 2014

(54) STREAMING VIDEO SERVER WITH VIRTUAL FILE SYSTEM AND METHODS FOR USE THEREWITH

(71) Applicant: Morega Systems Inc., Toronto (CA)

(72) Inventor: King Chiu Tam, Vaughan (CA)

(73) Assignee: Morega Systems, Inc, Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,372

(22) Filed: Jul. 2, 2013

(65) Prior Publication Data

US 2013/0291006 A1    Oct. 31, 2013

Related U.S. Application Data

(63) Continuation of application No. 13/095,060, filed on Apr. 27, 2011, now Pat. No. 8,510,555.

(51) Int. Cl.
*H04L 29/06* (2006.01)
(52) U.S. Cl.
USPC ................................ 713/168; 725/31; 725/93

(58) Field of Classification Search
USPC ....................................... 713/168; 725/31, 93
See application file for complete search history.

(56) References Cited

U.S. PATENT DOCUMENTS

2008/0101466 A1* 5/2008 Swenson et al. ......... 375/240.07

OTHER PUBLICATIONS

"Multicast video-on-demand services"; Ma et al; ACM SIGCOMM Computer Communication Review, 2002; 13 pages.*
"Video fingerprinting and encryption principles for digital rights management"; D.Kundur et al; Proceedings of the IEEE, Jun. 2004; 15 pages.*

* cited by examiner

*Primary Examiner* — Jason Lee
(74) *Attorney, Agent, or Firm* — Garlick & Markison; Bruce E. Stuckman

(57) ABSTRACT

A streaming video server generates a virtual file system that includes virtual addresses of a plurality of encrypted segments of a plurality of video programs at each of a plurality of bitrates, without storing the plurality of encrypted segments in persistent storage. A request is received from a client device to access a selected one of the plurality of video programs via a request to access the virtual file system. The plurality of encrypted segments of the selected one of the plurality of video programs are generated at a selected bitrate, in response to the request.

20 Claims, 7 Drawing Sheets

Content index 120

| Title | URL |
|---|---|
| Moon Wars | www.Morega.com/bwetyuyt |
| The Duchy Strikes Back | www.Morega.com/ashdkjhk |
| Return of the Antennae | www.Morega.com/qweiocbn |
| ... | ... |

Playlist data 112

Segment playlist 122

Title: Moon Wars

| Segment# | Segment Address | Encryption Key URL |
|---|---|---|
| 00000001 | www.Morega.com/bwt00000001 | www.Morega.com/bwt00000001ec |
| 00000002 | www.Morega.com/bwt00000002 | www.Morega.com/bwt00000002ec |
| 00000003 | www.Morega.com/bwt00000003 | www.Morega.com/bwt00000003ec |
| ... | ... | ... |

FIG. 3

Variant playlist data 114

| Title | Bit Rate | Segment Playlist Address |
|---|---|---|
| Moon Wars | 64 kbps | www.Morega.com/64btw00000000 |
| | 128 kbps | www.Morega.com/128btw00000000 |
| | 256 kbps | www.Morega.com/256btw00000000 |
| | 512 kbps | www.Morega.com/512btw00000000 |
| | 1 Mbps | www.Morega.com/1024btw00000000 |
| | 2 Mbps | www.Morega.com/2048btw00000000 |

FIG. 4

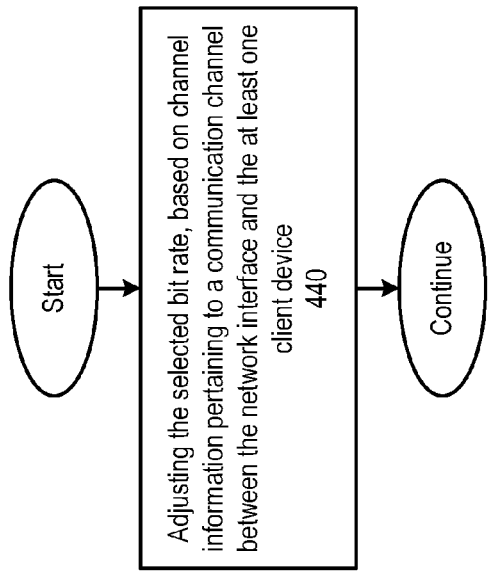
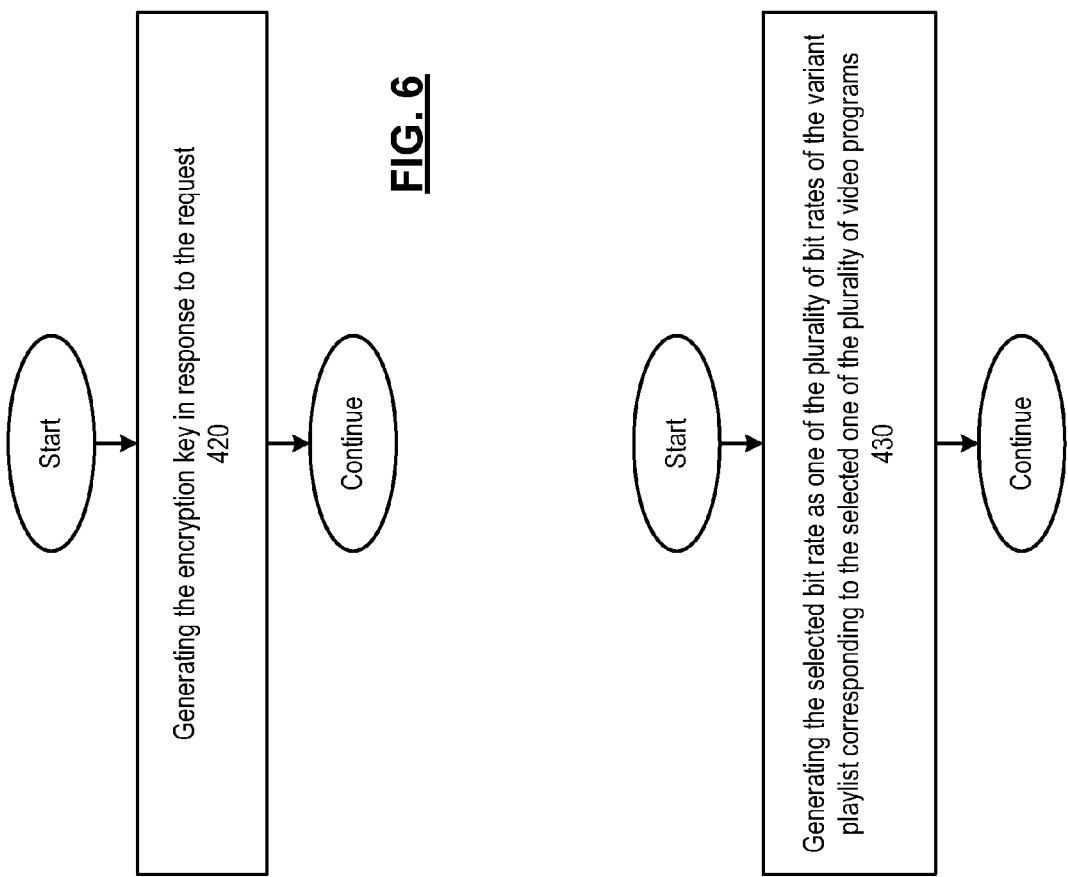

STREAMING VIDEO SERVER WITH VIRTUAL FILE SYSTEM AND METHODS FOR USE THEREWITH

CROSS REFERENCES TO RELATED APPLICATIONS

The present U.S. Utility patent application claims priority pursuant to 35 U.S.C. §120, as a continuation, to the U.S. Utility patent application Ser. No. 13/095,060, titled STREAMING VIDEO SERVER WITH VIRTUAL FILE SYSTEM AND METHODS FOR USE THEREWITH, filed Apr. 27, 2011, which is hereby incorporated herein by reference in its entirety and made part of the present U.S. Utility patent application for all purposes.

TECHNICAL FIELD OF THE INVENTION

The present invention relates to servers used for streaming media applications including video on demand.

DESCRIPTION OF RELATED ART

The number of households having multiple television sets is increasing, and many users want the latest and greatest video viewing services. As such, many households have satellite receivers, cable set-top boxes, and televisions, et cetera, that provide access to broadcast video services. For in-home Internet access, each computer or Internet device can have its own Internet connection. As such, each computer or Internet device includes a modem. As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. As an alternative to broadcast video, the Internet provides access to streaming video services. Instead of broadcasting all programming to every customer, each customer receives only those programs that they want, when they want them.

One of the most common ways of streaming video over the Internet today is through the use of the "HTTP Live Streaming" (HLS) protocol. It is developed by Apple Corporation and supported in most of Apple's devices. The HLS protocol operates on a streaming server that uses a standard HTTP (Hypertext Transfer Protocol) web server component. A video encoder takes a source video and encodes it at different bitrates intended for use in different network conditions (high or low capacity) and with different playback devices. A variant playlist is stored on the server's file system that describes one video that is available in multiple bitrates. For each available bitrate, a server-side tool takes the encoder's output file and breaks it into segments of equal duration (usually 10 seconds); these segments are stored on the server's file system. The segments may be optionally encrypted.

For each available bitrate, a playlist is stored on the server's file system. The playlist specifies the properties (most importantly duration and URI) of the available segments. The encoded video, variant playlists and playlists must be prepared and available to the web server prior to streaming. The client initiates streaming by first requesting the variant playlist over HTTP. The client requests the first playlist listed in the variant playlist. The client requests the first segment in the playlist, then the second, and so on. Depending on the transfer rate of a segment, the client will choose to switch to a playlist for a higher or lower bitrate, and proceed to request the video segments from the new playlist. The received segments are decoded and displayed by the client as one continuous video stream.

An advantage of HLS streaming is that the server is a standard web server. Beyond the application-specific tools needed for segmentation and playlist generation, the software and infrastructure comprises of standard and freely available components that are often already in place. The limitations and disadvantages of HLS and other conventional and traditional approaches will become apparent to one of ordinary skill in the art through comparison of such systems with the present invention.

BRIEF DESCRIPTION OF THE SEVERAL VIEWS OF THE DRAWINGS

FIG. 3 presents a block diagram representation of playlist data 112 in accordance with an embodiment of the present invention.

FIG. 4 presents a block diagram representation of variant playlist data 114 in accordance with an embodiment of the present invention.

FIG. 6 presents a flowchart representation of a method in accordance with an embodiment of the present invention.

FIG. 7 presents a flowchart representation of a method in accordance with an embodiment of the present invention.

FIG. 8 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
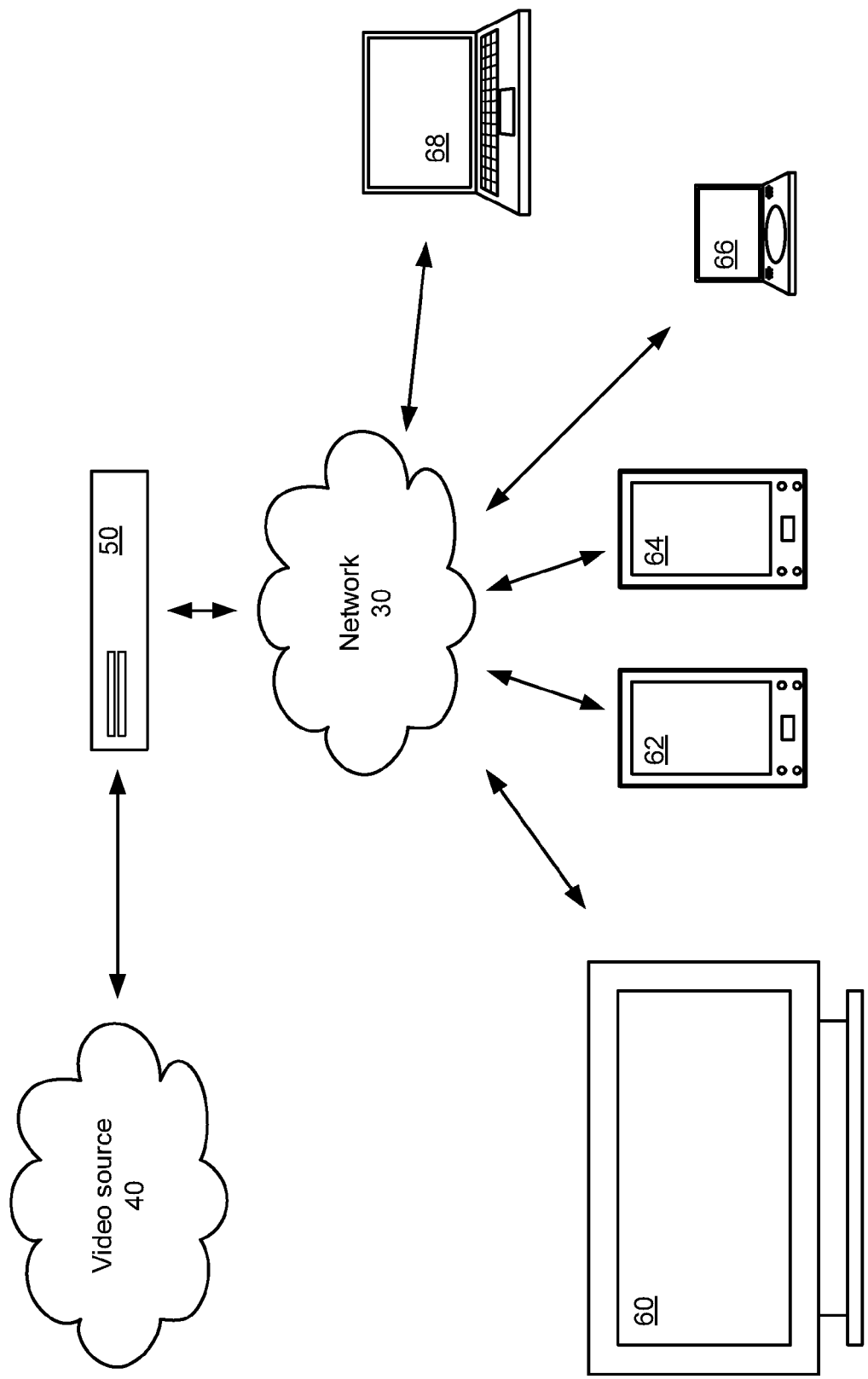
FIG. 1 presents a pictorial representation of a content distribution system that in accordance with an embodiment of the present invention.

FIG. 1 presents a pictorial representation of a content distribution system in accordance with an embodiment of the present invention. In particular, a streaming video server 50 is capable of accessing and distributing content from one or more video sources 40 to a plurality of client devices such as a television 60, smart phone, internet tablet or other personal media players 62 and 64, handheld video player 66, and personal computer 68. While specific client devices are shown, video server 50 is capable of accessing and distributing content from one or more video sources 40 to other client devices that can receive and reproduce media content.

The streaming video server 50 uses an on-demand encoding process and a virtual file system. In an embodiment of the present invention, the streaming video server 50 allows many bitrates to be supported with no additional requirements for persistent storage. The streaming video server 50 accesses a virtual file system containing the files needed for streaming: variant playlist files, playlist files, content encryption keys, and video segment files. The video data in the file system may be not stored in a real non-volatile storage device; instead the data may be generated only when necessary due to a read operation in request for particular video content from a client device.

In the example shown, the video source or sources 40 are external to the system and coupled to the streaming video server 50 to provide coded audio-video streams via a secure channel, such as a secure socket layer (SSL) connection, a private network, a virtual private network or other secure connection. The video source or sources 40 can have two types of content: live and pre-recorded. An example of live content is a video conference. Pre-recorded material may include but is not limited to content stored by a digital video recorder, UPnP media server, camcorder, personal computer or other video storage. The two types of content can be handled differently when limited network bandwidth causes the rate of data transfer to the client to be lower than the encoding rate. For live content, the streaming system discards portions of the audio-video stream that could not be transferred within some time limit. This ensures that the delay between transmission at the source, and decoding and playback at the client is bounded. For a video conference, this means that conversations will not be hampered by excessive delays, but there may be discontinuities in the conversation when the network slows suddenly. Pre-recorded content can be streamed in a continuous manner. If the network slows suddenly and the client runs out of data to decode, it handles this in the short term by waiting for more data, and in the longer term by selecting a variant playlist with a lower bitrate.

In operation, the streaming video server 50 transcodes or decodes and re-encodes the content from a video source 40 to the bitrates corresponding to the playlists. In this fashion, encoding of a video program is performed only when it is needed in response to a client's request for that particular program. Therefore, videos that are made available by the streaming video server 50, but never requested by the client, do not incur the overhead of encoding.

When streaming is initiated, a video encoder of streaming video server 50 is allocated for the session. The encoder outputs a continuous audio-video bitstream and then a post-processing step breaks the streaming into the required segments. In addition, the encryption key generation process can be performed on-demand. This allows the keys to not be saved to a storage device, protecting the security of the key from being read without authorization. For increased content security, the keys can be generated randomly and are never used for more than one streaming session. The encryption process can also be performed on-demand.

Streaming video server 50 can further include one or more features of the present invention described further in conjunction with FIGS. 2-9 that follow.

Figure 2:
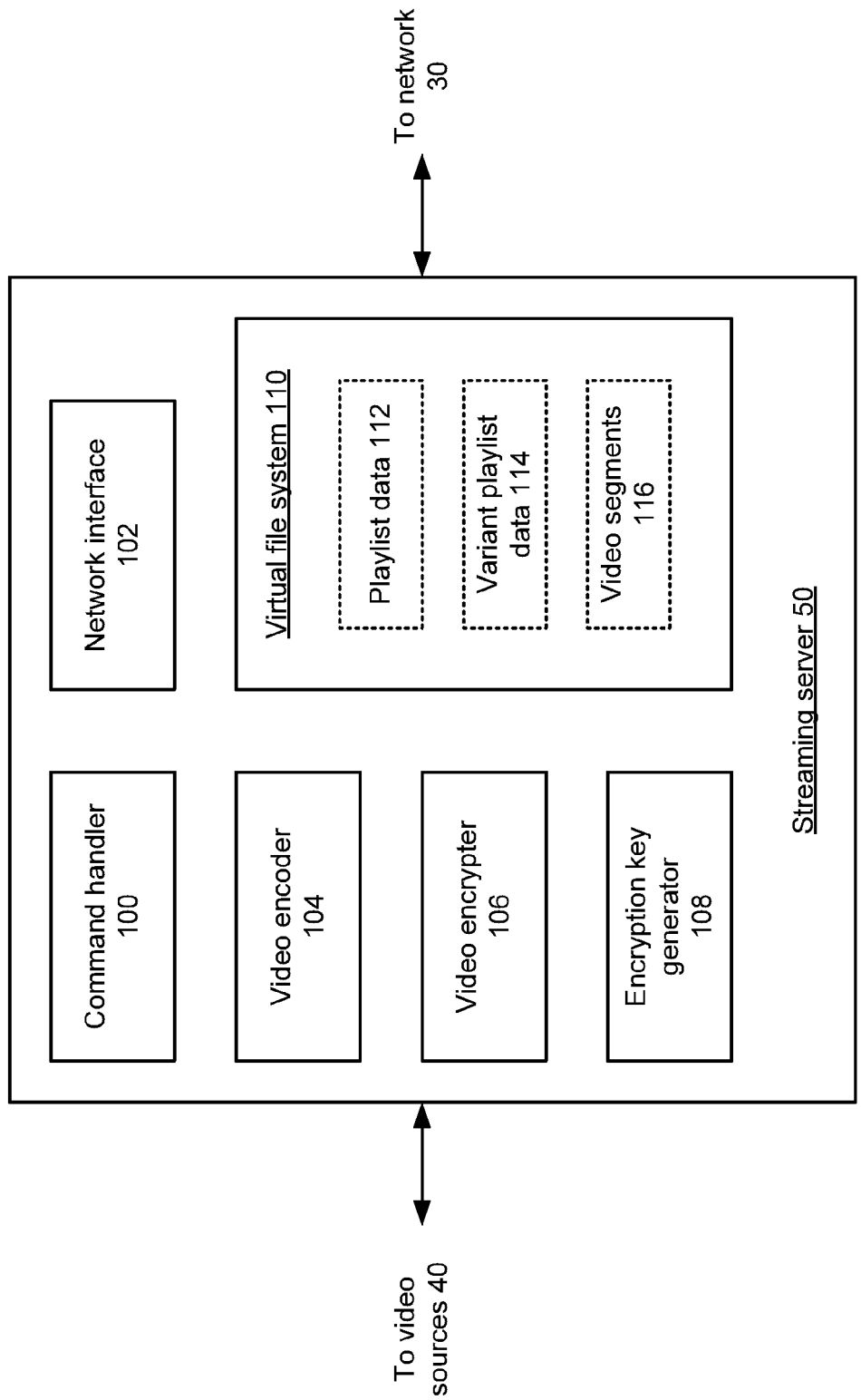
FIG. 2 presents a block diagram representation of streaming server 50 in accordance with an embodiment of the present invention.

FIG. 2 presents a block diagram representation of streaming server 50 in accordance with an embodiment of the present invention. As shown, streaming video server 50 includes a command handler 100, one or more video encoders 104 and video encrypters 106, and an encryption key generator 108. Streaming video server 50 also includes virtual file system 110 that stores playlist data 112 that includes a content index corresponding to the video programs available from the video source or sources 40 as well as a segment playlist for each video program that includes a list of addresses for each segment of that video program. Virtual file system 110 further stores variant playlist data 114 that indicates a plurality of bit rates for streaming each of the plurality of video programs. The URIs in the content index, variant playlist, and segment playlist do not correspond to actual files as in a traditional web server or streaming server that serves files stored on hard drive. These addresses are generated by the streaming video server 50 and recognized as references to the virtual files when the client makes the HTTP request for a particular video program. This applies to the URIs for the lists themselves and also for the encrypted segment data and encryption keys. When a request is received for a "file" in the virtual file system, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding, segmenting, and return the next segment to the client.

A network interface 102 is included to bidirectionally communicate with at least one client device via network 30 and to bidirectionally communicate with the at least one video source, such as via a secure channel of network 30 or another network. The network interface 102 can include a modem, transceiver or other network interface adaptor that implements a serial or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol. In addition or in the alternative, the network interface 102 can include a wireless link for coupling to the network 30 and/or video source or sources 40 either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol.

In operation, the command handler 100 coordinates the encoding and encryption processes with a client's requests for video content. For example, the command handler 100 receives a HTTP request for a selected one of the plurality of video programs from the at least one client device via the network interface 102. In response to the request, the selected one of the plurality of video programs is retrieved from the video source or sources 40, via the network interface. For example, the command handler can access the playlist data 112 to determine the universal resource identifier (URI) or other address for retrieving the selected one of the plurality of video programs from the video source or sources 40.

The command handler 100 retrieves the selected one of the plurality of video programs. A plurality of encoded segments are generated from selected video program, via a video encoder 104, at a selected bit rate. The video encoder 104 can include one or more encoders or transcoders that receive an encoded video program from the video source or sources 40 and that decodes and re-encodes or otherwise transcodes the video program into the scale, resolution, and digital compression format, and at the selected bitrate for the requesting client device. In particular, the video encoder 104 can operate in accordance with a motion picture expert group (MPEG) format such as MPEG2, MPEG4 part 10, also referred to as H.264. Other video formats such as VC1, digital video (DV), etc., could likewise be employed. In an embodiment of the present invention, the video source or sources 40 contain unsegmented videos. Upon the client request of the first segment for a particular video and bitrate, the streaming video server 50 starts the retrieval of the video from the corresponding video source 40, and performs the encoding and segmentation. The segmentation can be done before or after the encoding, though it can be more practical to do the encoding first, then the segmentation.

Encrypted segments are generated from the encoded segments, via the video encrypter 106, based on an encryption key. The encrypted segments are then stored as video segments 116 that are then sent, via the network interface 102, as a streaming video signal to the at least one client device that requested the video program. The video encrypter 106 can operate in accordance with one or more cryptography algorithms such as data encryption standard (DES), Rivest, Shamir, Adelman (RSA), elliptical curve cryptography (ECC), Advanced Encryption Standard (AES) or other algorithm.

Streaming server module 50 includes an encryption key generator that generates the encryption key in response to the request. As discussed in conjunction with FIG. 1, the encryption key generator 108 generates encryption keys on-demand. This allows the keys to not be saved to a storage device, protecting the security of the key from being read without authorization. For increased content security, the keys can be generated randomly and are used for only one streaming session. In theory, while identical encryption keys could reoccur randomly, each encryption key is nevertheless practically or substantially unique to the request.

In an embodiment of the present invention, the command handler 100 generates the selected bit rate, as one of the plurality of bit rates of the variant playlist corresponding to the selected one of the plurality of video programs. For example, the command handler 100 obtains channel information from network 30 pertaining to a communication channel between the network interface and the client device that generated the request. The channel information can include a channel type, such as 3G, 4G, cable modem, 10base100 Ethernet, digital subscriber line or other network type that has an associated maximum bit rate or other expected bit rate. In addition or in the alternative, the channel information includes data that indicates current channel conditions, such as current available or actual bit rates, or other indicators of current conditions that can be used to generate a current bit rate. In addition to setting an initial bit rate, the command handler 100 further adjusts the selected bit rate, based on channel information pertaining to a communication channel between the network interface and the requesting client device to adapt to current channel conditions on, for example, a segment by segment basis. As the bit rate is adjusted, the video encoder 104 encodes each current segment at the selected rate.

The command handler 100, video encoder 104, video encrypter 106, encryption key generator 108 and virtual file system can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The streaming video server has additional advantages over convention servers. No persistent storage is required for the video segments, variant playlist, and playlists. This is especially important for embedded systems with limited storage capabilities. In addition, since the encryption process is performed on-demand like the encoding process, the key can be protected such that it can be accessed only by the intended client device, as opposed to all potential clients. Furthermore, the key itself can be changed while streaming is in progress, and this decision can be made during run-time as needed. These content protect features are especially important for premium content such as pay-per-view video. Further, the risk of unauthorized access to unencrypted video streams is reduced since they are never stored in encrypted or unencrypted form to a persistent storage device where they may be accessed by attackers. Also, live and pre-recorded video content can be handled differently. Streams from live sources will not suffer large delays.

FIG. 3 presents a block diagram representation of playlist data 112 in accordance with an embodiment of the present invention. FIG. 4 presents a block diagram representation of variant playlist data 114 in accordance with an embodiment of the present invention. In the example shown, playlist data 112 includes content index 120 a title of all available video selections from any of video sources 40, and a URI address for accessing the variant playlist data 114 for each program. The content index does not have to be in a particular format, as long as the client devices and the streaming video server 50 use the same format or the formats can be translated to be compatible. Example formats include JSON, XML, plain text, etc. Other address formats could likewise employed including a file addressing scheme, an IP address, or other logical or physical addressing. In addition, the while specific video on-demand programs are presented, as previously discussed, live video programming could be retrieved, segmented, encoded and encrypted on demand for delivery in response to a client request.

In addition, playlist data 112 includes a segment playlist 122 for each video program and for each bitrate. Each segment playlist includes a segment number and address for each segment of the video program and optionally an address of an encryption key used for encrypting that particular segment. Again, while URIs are shown, Other address formats could likewise employed including a file addressing scheme, an IP address, or other logical or physical addressing.

The virtual file system also contains variant playlists for each video program in the content index. Each variant playlist includes an address (such as the URI shown) for the segment playlists, which are also contained in the virtual file system, covering a wide range of possible bitrates. The bitrates cover the cases of streaming over a local-area network (high bitrates), internet and mobile networks (lower bitrates).

In one example of operation, the streaming video server maintains playlist data 112 that includes a content Index that is served to the client upon its request. The streaming video server 50 can, for example, query each of the video sources 40 or its list of videos, then aggregate them to the create such a content index. The content index contains, for each item, the URI of the variant playlist. The client selects one item (e.g., via user input), then makes the HTTP request for the URI corresponding to that variant playlist for that item. The variant playlist contains the segment playlist URI for each bitrate, as shown in FIG. 4. The client makes an HTTP request for the selected bitrate's playlist (first on list by default). The segment playlist contains the URIs for each segment's data and each segment's encryption key.

The URIs in the content index, variant playlist, and segment playlist do not correspond to actual files as in a traditional web server or streaming server that serves files stored on hard drive; the URIs are generated by the server and recognized as references to the virtual files when the client makes the HTTP request. This applies to the URIs for the lists themselves and also for the segment data and encryption keys. When a request is received for a "file" in the virtual filesystem, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding and segmentation, return the next segment to the client.

As shown the variant playlist data includes a plurality of selectable bit rates for a particular title, a group of titles, for all programs from a particular video source 40 or from all video sources. While 6 different bitrates are shown, a greater or fewer number can be implemented including additional or alternative bitrates not expressly shown.

The streaming video server 50 provides additional advantages over a conventional HLS-based server system. Multiple video encoders 104 can be present in order to meet the simultaneous use requirements of on-demand transcoding for multiple client devices. The encoded data is generated on as-needed basis and never stored persistently, saving storage. Encryption keys are generated on an as-needed basis and never stored except temporarily in volatile memory, also saving storage. Encoded data and encryption keys are never stored permanently, improving content security. Also, live and pre-recorded content can be handled differently, resulting in improved user experience.

A conventional HLS-based server system must store the video for all bitrate settings. The requirement for storage capacity grows with the number of bitrate settings and duration of the video. The data must be stored even though it may never be requested by the client, because it can't be absolutely determined at encoding time which particular segments will be used by the clients. In the present system, the data resulting from video transfer from a video source source 40, encoding, key generation, and encryption are not stored to persistent storage (e.g. a hard drive). No transfer, encoding, segmentation, and encryption is done on a source video until that video is requested by the client.

In addition, in a conventional HLS-based server system, the bitrates for the video must be set before the encoding process starts. Some knowledge of the expected network capacity and playback device types is required in order to select the appropriate bitrates. Typically, three bitrates are used: one low bitrate setting of approximately 64 kbps, and two higher settings between 100 and 500 kbps. Setting the bitrates at encoding time means that the target use cases are also set. Any unexpected cases (e.g., very high network capacity, a new client device) are not addressed. When the video segments are encrypted, an encryption key must be selected that is to be used by all clients.

In contrast, the streaming video server 50 can employ a wider range of bitrates without having to encode and store the encoded and encrypted video segments at all of those bitrates prior to streaming. In an embodiment of the present invention, prior to streaming, little needs to be known about the client device and the possible network conditions. Support can be added for all bitrates that can be reasonable expected, and those that are not used incur no cost in terms of encoding, which is typically a time-consuming and processing-intensive task. For example, the bitrate settings might be selected to include the high rates expected when streaming over a local network, and also the relatively low rates expected when streaming over the internet. In addition, since additional bitrate settings can be added for little additional cost, the bitrate values can be selected with a fine granularity over the full range required. This reduces the distracting effect of the video and audio quality changing greatly from one segment to the other due to a large change in bitrate. More importantly, the additional bitrates allow for the network usage to be optimized for the current conditions. That is, it is more likely that the selected bitrate is the maximum allowed by the network connection between the server and client, thus maximizing the video and audio quality for the end user.

Figure 5:
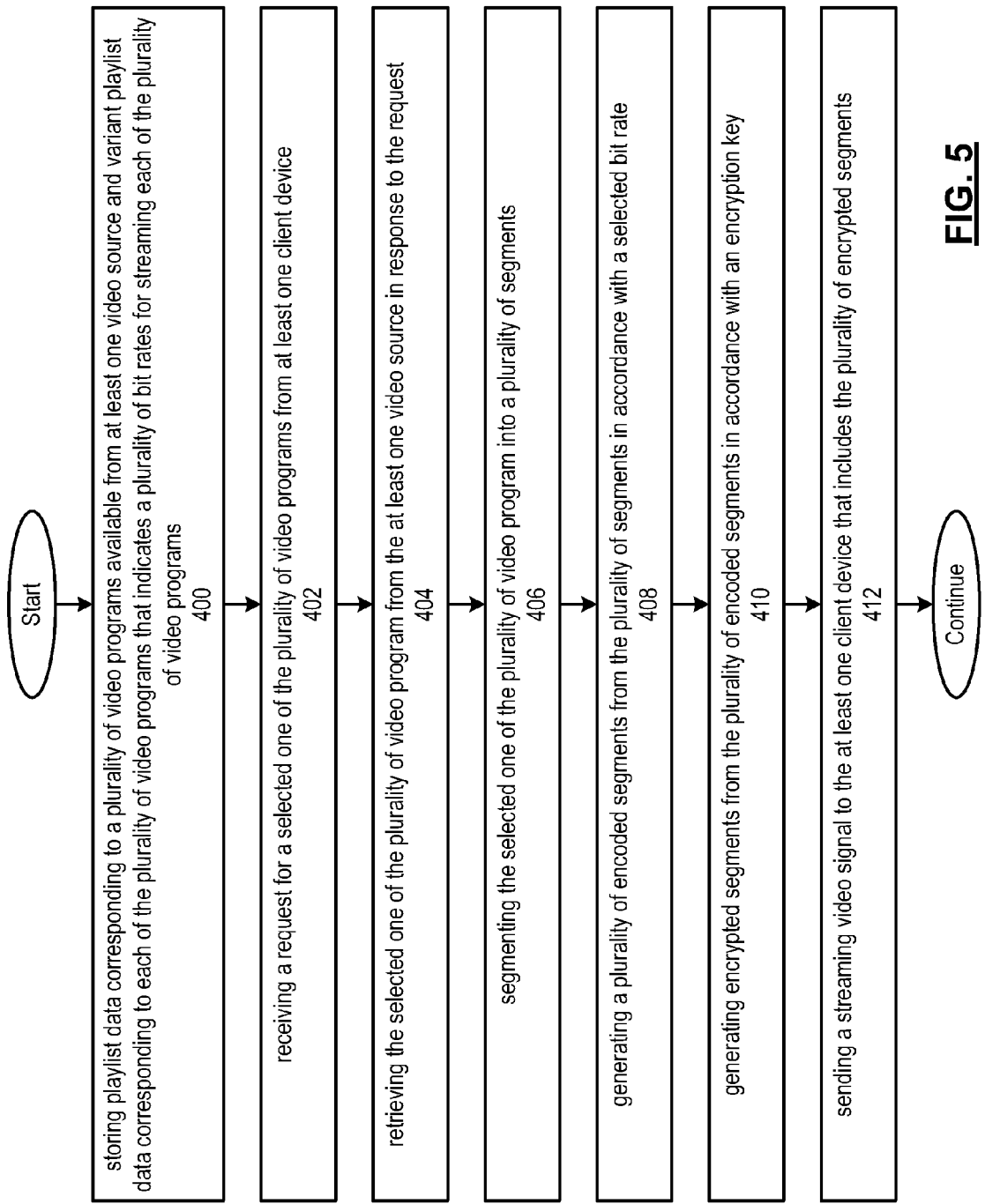
FIG. 5 presents a flowchart representation of a method in accordance with an embodiment of the present invention.

FIG. 5 presents a flowchart representation of a method in accordance with an embodiment of the present invention. In particular a method is shown for use in conjunction with one or more functions and features described in conjunction with FIGS. 1-4. In step 400, playlist data is stored corresponding to a plurality of video programs available from at least one video source and variant playlist data corresponding to each of the plurality of video programs that indicates a plurality of bit rates for streaming each of the plurality of video programs. In step 402, a request for a selected one of the plurality of video programs is received from at least one client device. In step 404, the selected one of the plurality of video program is retrieved from the at least one video source in response to the request. In step 406, the selected one of the plurality of video program is segmented into a plurality of segments. In step 408, a plurality of encoded segments is generated from the plurality of segments in accordance with a selected bit rate. As discussed, the ordering of the steps 406 and 408 can be reversed.

In step 410 encrypted segments are generated from the plurality of encoded segments in accordance with an encryption key. In step 412, a streaming video signal is sent to the at least one client device that includes the plurality of encrypted segments.

In an embodiment of the present invention, at least one video source is located remotely from the streaming server. The playlist data can include a plurality of segment playlists corresponding to each of the plurality of video programs and a content index, each of the plurality of segment playlists including encrypted segment addresses of the plurality of segments of a corresponding one of the plurality of video programs. The method can include serving at least one selected segment playlist and a selected variant playlist to the client device that corresponds to the selected video program. Step 412 can include fulfilling client requests to the virtual file system that contain particular segment addresses of the virtual file system, by generating and sending the encrypted segment that corresponds to each particular segment address.

FIG. 6 presents a flowchart representation of a method in accordance with an embodiment of the present invention. In particular a method is shown for use in conjunction with one or more functions and features described in conjunction with FIGS. 1-5. In step 420, the encryption key is generated in response to the request. For example, the encryption key can be generated to be substantially unique to the request.

FIG. 7 presents a flowchart representation of a method in accordance with an embodiment of the present invention. In particular a method is shown for use in conjunction with one or more functions and features described in conjunction with FIGS. 1-6. In step 430, the selected bit rate is generated as one of the plurality of bit rates of the variant playlist corresponding to the selected one of the plurality of video programs.

In addition, the selected bit rate can be further based on channel information pertaining to a communication channel between the network interface and at least one client device. The channel information can include data that indicates a channel type and/or current channel conditions.

FIG. 8 presents a flowchart representation of a method in accordance with an embodiment of the present invention. In particular a method is shown for use in conjunction with one or more functions and features described in conjunction with FIGS. 1-7. In step 440, the selected bit rate is adjusted, based on channel information pertaining to a communication channel between the network interface and the at least one client device.

Figure 9:
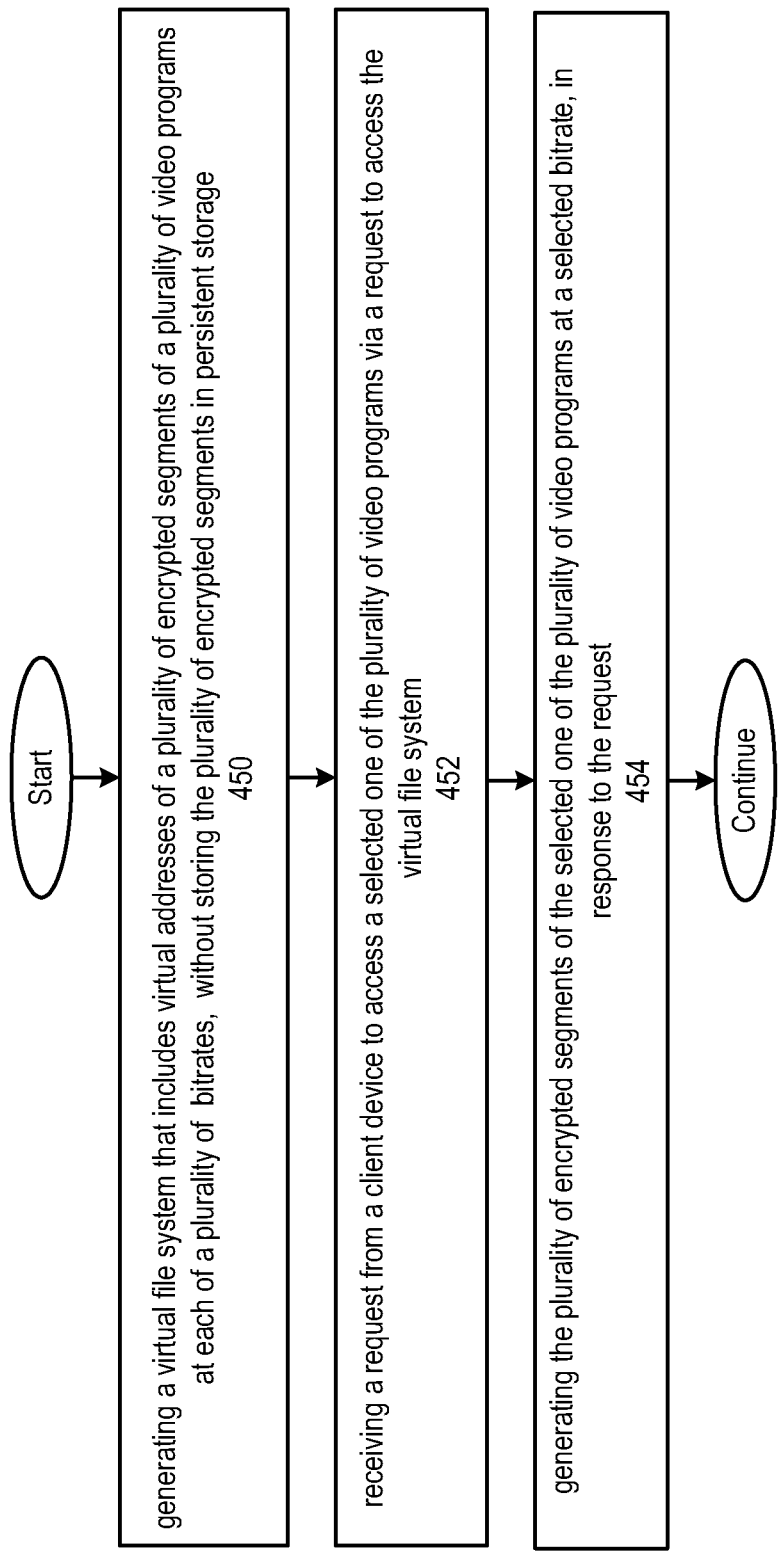
FIG. 9 presents a flowchart representation of a method in accordance with an embodiment of the present invention.

FIG. 9 presents a flowchart representation of a method in accordance with an embodiment of the present invention. In particular a method is shown for use in conjunction with one or more functions and features described in conjunction with FIGS. 1-8. In step 450, a virtual file system is generated that includes virtual addresses of a plurality of encrypted segments of a plurality of video programs at each of a plurality of bitrates, without storing the plurality of encrypted segments in persistent storage. In step 452, a request is received from a client device to access a selected one of the plurality of video programs via a request to access the virtual file system. In step 454, the plurality of encrypted segments of the selected one of the plurality of video programs are generated at a selected bitrate, in response to the request.

In preferred embodiments, optional circuit components can be implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a media distribution system. While described primarily in terms of video programming, it is understood that the video programming can include associated audio and that the present invention could likewise to be applied to associated audio or the distribution of audio programming that is unassociated with video. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A streaming server comprising:
an apparatus that operates via a processing device and a memory device and that includes:
  a network interface, coupled to bidirectionally communicate with at least one client device and to bidirectionally communicate with the at least one video source via at least one network;
  a video encoder;
  a video encrypter;
  a command handler, coupled to the network interface, the video encoder, and the video encrypter, that operates by:
    receiving a request for a selected one of the plurality of video programs from the at least one client device via the network interface;
    wherein the command handler responds to the request by retrieving the selected one of the plurality of video programs from the at least one video source via the network interface and further by segmenting and encoding at least a portion of the selected one of the plurality of video programs into a plurality of encoded segments via the video encoder;
    generating encrypted segments from the plurality of encoded segments, via the video encrypter, in accordance with an encryption key; and
    serving at least one selected segment playlist to the at least one client device that corresponds to the selected one of a plurality of video programs, wherein the segment playlist includes segment addresses of a virtual file system corresponding to the plurality of encrypted segments of the selected one of the plurality of video programs;
    sending, via the network interface, a streaming video signal to the at least one client device that includes the plurality of encrypted segments by fulfilling client requests that contain particular segment addresses of the virtual file system, and by sending the encrypted segment that corresponds to each particular segment address.

2. The streaming server of claim 1 wherein that at least one video source is remote from the streaming server.

3. The streaming server of claim 1 further comprising:
an encryption key generator, coupled to the command handler and the video encrypter, that generates the encryption key in response to the request.

4. The streaming server of claim 3 wherein the encryption key is generated to be unique to the request.

5. The streaming server of claim 1 wherein the command handler serves a variant playlist to the at least one client device that includes a plurality of bitrates.

6. The streaming server of claim 5 wherein the command handler generates the plurality segments at a selected bit rate, based on the plurality of bit rates of the variant playlist.

7. The streaming server of claim 6 wherein the command handler further generates the selected bit rate, based on channel information pertaining to a communication channel between the network interface and the at least one client device.

8. The streaming server of claim 7 wherein the channel information includes data that indicates a channel type.

9. The streaming server of claim 7 wherein the channel information includes data that indicates current channel conditions.

10. The streaming server of claim 6 wherein the command handler further adjusts the selected bit rate, based on channel information pertaining to a communication channel between the network interface and the at least one client device.

11. A streaming server comprising:
an apparatus that operates via a processing device and a memory device and that includes:
a network interface, coupled to bidirectionally communicate with at least one client device;
a video encoder;
a video encrypter;
a command handler, coupled to the network interface, the video encoder, and the video encrypter, that operates by:
receiving a request for a selected one of the plurality of video programs from the at least one client device via the network interface;
wherein the command handler responds to the request by retrieving the selected one of the plurality of video programs and further by segmenting and encoding at least a portion of the selected one of the plurality of video programs into a plurality of encoded segments via the video encoder at a selected bit rate;
Generating encrypted segments from the plurality of encoded segments, via the video encrypter, in accordance with an encryption key; and
serving at least one selected segment playlist to the at least one client device that corresponds to the selected one of a plurality of video programs, wherein the segment playlist includes segment addresses of a virtual file system corresponding to the plurality of encrypted segments of the selected one of the plurality of video programs;
sending, via the network interface, a streaming video signal to the at least one client device that includes the plurality of encrypted segments by fulfilling client requests that contain particular segment addresses of the virtual file system, and by sending the encrypted segment that corresponds to each particular segment address.

12. The streaming server of claim 11 wherein that at least one video source is remote from the streaming server.

13. The streaming server of claim 11 further comprising:
an encryption key generator, coupled to the command handler and the video encrypter, that generates the encryption key in response to the request.

14. The streaming server of claim 13 wherein the encryption key is generated to be unique to the request.

15. The streaming server of claim 11 wherein the command handler serves a variant playlist to the at least one client device that includes a plurality of bitrates.

16. The streaming server of claim 15 wherein the command handler generates the plurality segments at the selected bit rate, based on the plurality of bit rates of the variant playlist.

17. The streaming server of claim 16 wherein the command handler further generates the selected bit rate, based on channel information pertaining to a communication channel between the network interface and the at least one client device.

18. The streaming server of claim 17 wherein the channel information includes data that indicates at least one of: a channel type, and current channel conditions.

19. The streaming server of claim 11 wherein the command handler further adjusts the selected bit rate, based on channel information pertaining to a communication channel between the network interface and the at least one client device.

20. A streaming server comprising:
an apparatus that operates via a processing device and a memory device and that includes:
a network interface, coupled to bidirectionally communicate with at least one client device;
a video encoder;
a video encrypter;
a command handler, coupled to the network interface, the video encoder, and the video encrypter, that operates by:
receiving a request for a selected one of the plurality of video programs from the at least one client device via the network interface;
serving at least one selected segment playlist to the at least one client device that corresponds to the selected one of a plurality of video programs, wherein the segment playlist includes segment addresses of a virtual file system corresponding to a plurality of encrypted segments of the selected one of the plurality of video programs;
sending, via the network interface, a streaming video signal to the at least one client device that includes the plurality of encrypted segments by fulfilling client requests that contain particular segment addresses of the virtual file system, and by sending an encrypted segment of the plurality of encrypted segments that corresponds to each particular segment address;
wherein the command handler retrieves the selected one of the plurality of video programs and responds to the client requests that contain the particular segment addresses of the virtual file system by segmenting and encoding at least a portion of the selected one of the plurality of video programs into a plurality of encoded segments via the video encoder, and by generating the plurality of encrypted segments from the plurality of encoded segments, via the video encrypter, in accordance with an encryption key.

* * * * *